United States Patent Office

2,782,192
Patented Feb. 19, 1957

2,782,192

STEROID PRODUCTION

Raymond L. Pederson, Roman P. Holysz, and Arnold C. Ott, Kalamazoo, Mich., assignors to The Upjohn Company, Kalamazoo, Mich., a corporation of Michigan No Drawing. Application September 23, 1953,
Serial No. 381,998

12 Claims. (Cl. 260—239.5)

This invention relates to certain metal halide complexes of steroid enamines and to the use of these metal halide complexes to separate a steroid enamine from a mixture of steroids.

It is an object of the present invention to provide novel steroid enamine-metal halide complexes. Another object is the provision of a process for the separation of a steroid enamine from a mixture of steroids by precipitation of the steroid enamine as a metal halide complex. Still another object is the provision of a process for the separation of 3-keto-4-bisnorcholen-22-al from a mixture containing sitosteryl $\Delta^4$-3-ketones. Another object is the provision of a process for separating stigmasta-4,22-dien-3-one from a mixture containing sitosteryl $\Delta^4$-3-ketones. A further object is the provision of a process for the separation of mixtures of side-chain saturated and unsaturated sterols. Other objects will be apparent to those skilled in the art to which this invention pertains.

According to the present invention, a steroid enamine is separated from a mixture with a non-sterol, essentially neutral steroid by combining the steroidal mixture in an organic solvent with a halide salt of a B-group metal of the periodic table, and separating the precipitated steroid enamine-metal halide complex. The term "sterol" defines the group of solid alcohols derived chiefly from vegetable sources, which consist of high-atomic (cyclopentanopolyhydrophenanthrene) unsaturated alcohols. (See "Hackh's Chemical Dictionary" by Grant, The Blakiston Company, third edition, 1950.)

Various methods for the removal of steroids from neutral and synthetic mixtures containing them are known in the art. For example, U. S. Patent 2,559,193 describes the separation of sterols from non-steroidal alcohols, e. g., in wool grease, as urea complexes. In U. S. 2,568,202, the sterols are precipitated as sterol-metal salt complexes. U. S. 2,536,753 precipitates the sterols as zinc chloride complexes. British 505,052 separates monoketosteroids from polyketosteroids by using acidic substances or solutions thereof.

The present invention, however, is concerned with the separation of a steroid enamine from a non-sterol, essentially neutral steroid. These two thus-defined steroids may be in mixture with other steroids and/or other non-steroidal material, or constitute the sole components of the mixture. The non-sterol, essentially neutral steroidal fraction of the mixture may be a single steroid or several steroids.

Since sterols, acidic or other basic steroids present in the steroidal mixture may also form metal halide complexes, the process of the present invention has the greatest utility when these components are absent from the steroidal mixture. However, since the steroid enamine will be at least separated from non-sterol, neutral steroid impurity, the process has utility in the purification of a steroid enamine, even in the presence of these undesirable components.

The acid addition salts of steroid enamines are not desirable forms of the enamines for separation or purification purposes since, in the presence of small amounts of moisture, at least some of the steroid enamines, as their acid addition salts, are hydrolyzed back to the carbonyl steroid and the amine from which they were produced, thus destroying the steroid enamine.

The steroid enamine-metal halide complexes of the present invention may be represented by the formula St-Am·MX, wherein St represents a steroid molecule having a double bond alpha to Am, Am representing a secondary amino group attached to the steroid molecule at the nitrogen atom. MX defines a halide salt of a B-group metal. The theoretical molecular ratio of metal halide to steroid enamine varies with the particular enamine and metal halide. However, since a large molar equivalent excess of metal halide is usually employed in the reaction, the particular molecular ratio of metal halide to steroid in the resulting complex need not be predetermined. When this mixture in an organic solvent is mixed in solution with halide salt of a B-group metal, the steroid enamine is precipitated as an enamine-metal halide complex. Usually the starting mixture is comprised of sitosteryl $\Delta^4$-3-ketones and 3-keto-4-bisnorcholen-22-al, since, in the process disclosed hereinafter for the preparation of progresterone from a mixture of soya sterols, this mixture is an intermediate therein.

The halide salts which are the starting materials of the present invention are the halide salts of the B-group metals of the modern periodic table (see "Inorganic Chemistry" by Moeller, page 122, Wiley Publishers, 1952), viz., Cu, Ag, Au, Zn, Cd, Hg, Al, Ga, In, Tl, Ge, Sn, Pb, Sb, Bi, and Po. Preferred among the halide salts are those of the group IIB metals, i. e., zinc, cadmium and mercury, with halide salts of zinc being especially preferred. Although metal chlorides, bromides or iodides may be employed, the chloride salts are preferred. Zinc chloride is the metal halide of choice.

Steroid enamines which may be employed include 3, 20, or 22-enamines, especially the 22-enamines having a 3-hydroxy, methoxy, benzyloxy, acetoxy, keto, benzylmercapto or like function, an 11$\alpha$- or 11$\beta$-hydroxy, 11$\alpha$-acetoxy, 11-keto, 9(11)-oxido group or a $\Delta^{9(11)}$-double bond, and which may additionally have a 5-halo or hydroxy group, an i-ether group, a saturated or unsaturated A or B-ring or other substituents in the steroid nucleus.

Amino groups which, with an $\alpha(\beta)$ double bond, constitute the enamine group including pyrrolidyl, piperidyl, morpholino, dimethylamino, diethylamino, dibenzylamino, and the like. When the enamine group is at the 22 position of the steroid molecule, the enamine group is preferably piperidyl whereas the pyrrolidyl group is preferred at the 3 position.

The reaction is usually carried out in a substantially anhydrous organic solvent since at least some of the steroid enamine-metal halide complexes are somewhat hygroscopic. Solvents which are satisfactory include nitrobenzene, chlorobenzene, carbon tetrachloride, chloroform, aliphatic hydrocarbons, ethylene glycol dimethyl ether, dioxane, tetrahydrofuran, and the preferred diethyl ether, benzene, cyclohexane, petroleum ether, $\beta$-n-amylene and methylcyclohexane. The lower-alkanols are not preferred as the sole reaction solvent due to the relatively high solubility of the complex in these solvents, especially methanol and ethanol.

Room temperature is a satisfactory reaction temperature, although higher and lower temperatures, e. g., from about zero degrees centigrade to the boiling point of the reaction mixture, may be employed.

The oxidation and ozonization of soya sterol mixtures may be carried out according to methods known in the art (U. S. 2,601,287, issued June 24, 1952 to Heyl and Herr). The formation of the enamine may also be carried out according to known methods [Herr and Heyl, J. Am. Chem. Soc. 74, 3627 (1952)].

The following examples are illustrative of the products and process of the present invention but are not to be construed as limiting.

PREPARATION 1.—5β-ERGOST-22-EN-3-ONE

Two grams of five percent palladium-charcoal catalyst was added at room temperature to a solution of 1.4 grams of potassium hydroxide (Reagent Grade, 85 percent) in three liters of methanol contained in a five-gallon cylindrical bottle. The air in the bottle was displaced with hydrogen, and then, with vigorous mechanical stirring, hydrogen was introduced at about one to two atmospheres absolute pressure to prereduce the catalyst. Then 12.5 grams of 4,6,22-ergostatrien-3-one [Wetter and Dimroth, Ber., 70, 1665 (1937)], melting point 107–109 degrees centigrade, dissolved in 750 milliliters of methanol was added. To the resulting admixture was introduced 2.0 to 2.1 mole equivalents of hydrogen at about one to two atmospheres absolute pressure using vigorous mechanical stirring, the reaction being very rapid. When the hydrogenation reaction was complete, the mixture was acidified with acetic acid, filtered, and the solvent distilled from the resulting filtrate. The residual solid was triturated with water, filtered, and dried. The resulting approximately theoretical amount of white crystalline solid showed no absorption in the ultraviolet range of the light spectrum indicating complete hydrogenation of the four and six-double bonds. Infrared light absorption analysis showed that the three-keto group and the 22-double bond were unaffected. Chromatographic adsorption of the above product using Florisil magnesium silicate as the adsorbent and one percent acetone in Skellysolve B for elution gave pure 5β-ergost-22-en-3-one, in a yield of 79 percent of the theoretical amount, melting at 109–113 degrees centigrade and having an $[\alpha]_D^{24}$ of minus five degrees in chloroform.

Analysis.—Calculated for $C_{28}H_{46}O$: C, 84.35; H, 11.63. Found: C, 84.37; H, 11.79.

PREPARATION 2.—3-KETOBISNORCHOLAN-22-AL

Five grams (0.0125 mole) of 5β-ergost-22-en-3-one was dissolved in 225 milliliters of methylene dichloride containing two milliliters of pyridine. The resulting solution was cooled in a Dry-Ice-acetone bath and was stirred mechanically while a stream of an ozone-oxygen mixture was bubbled through the solution. The amount of ozone introduced was about 1.3 moles per mole of steroid. After ozonization was complete, the resulting solution was treated with thirty milliliters of glacial acetic acid followed by ten grams of zinc and then stirred for one hour, the temperature being allowed to rise to about zero degrees centigrade during this period. Then the mixture was filtered to remove the zinc, and the filtrate was washed with ice water, cold dilute sodium bicarbonate solution, and again with ice water. The methylene dichloride solution, after drying over anhydrous sodium sulfate, was concentrated under reduced pressure to a volume of about twenty milliliters. Forty milliliters of isopropanol was then added and the solution further concentrated until crystals began to form. After refrigeration at zero degrees centigrade overnight, 2.60 grams of 3-ketobisnorcholan-22-al was obtained having an $[\alpha]_D^{24}$ of plus nineteen degrees in chloroform. Further concentration of the mother liquor gave an additional 0.93 gram of aldehyde. The structure was confirmed by infrared light absorption analysis. The total yield was 85.2 percent of the theoretical amount.

Analysis.—Calculated for $C_{22}H_{34}O_2$; C, 79.95; H, 10.37. Found: C, 79.73; H, 10.28; C, 79.82; H, 10.45.

PREPARATION 3.—22-(N-PIPERIDYL)-20(22)-BISNORCHOLEN-3-ONE

A solution of 1.98 grams (six millimoles) of 3-keto-bisnorcholan-22-al, 0.504 grams (six millimoles) of piperidine and a small crystal of para-toluenesulfonic acid in fifteen milliliters of benzene was refluxed for fifteen minutes whereafter the water of reaction was removed from the refluxing solution by a water trap. An additional twenty milliliters of benzene and 0.20 gram of piperidine were then added dropwise while the mixture was refluxed for an additional 1.75 hours. The cooled solution was washed with water followed by a ten percent aqueous solution of sodium hydroxide and finally with water. The organic layer was then distilled to dryness, leaving a crystalline residue of 22-(N-piperidyl)-20(22)-bisnorcholen-3-one melting at 105 to 108 degrees centigrade, having an $[\alpha]_D$ of plus 21 degrees in chloroform and an $\epsilon_{227}^{methanol}$ of 6,175.

Analysis.—Calculated for $C_{27}H_{43}NO$: C, 81.55; H, 10.90; N, 3.52. Found: C, 81.74; H, 10.78; N, 3.43.

Example 1.—22 - (N - piperidyl) - 4,20(22)-bisnorcholadiene-3-one-zinc chloride complex A solution of 5.45 grams (0.04 mole) of zinc chloride in 110 milliliters of anhydrous ether was prepared by stirring the zinc chloride in the ether for three hours at room temperature, while protecting the solution from moisture. To the resulting solution was added, over a period of twenty minutes with rapid stirring, a solution of 3.83 grams (0.0097 mole) of 22-(N-piperidyl)-4,20(22)-bisnorcholadien-3-one [Herr and Heyl, J. Am. Chem. Soc., 74, 3627 (1952)] in ninety milliliters of anhydrous ether. A precipitate formed immediately and after the addition was complete the mixture was cooled to about zero degrees centigrade for two hours, whereafter the precipitate was filtered and then dried over calcium chloride at reduced pressure. The dried precipitate weighed 7.69 grams, a yield of 97.3 percent of the theoretical, calculated on material having the empirical formula and analysis given below. Less than one percent of the starting material remained in the filtrate.

Analysis.—Calculated for $(C_{27}H_{41}NO)(ZnCl_2)_3$: Cl, 26.4. Found: Cl, 27.5.

A mixture of 6.34 grams (0.0078 mole) of this zinc chloride complex and fifty milliliters of acetic acid was combined with stirring at about ten to fifteen degrees centigrade with 4.77 grams (0.016 mole) of dihydrated sodium dichromate in a mixture of 35 milliliters of acetic acid and 25 milliliters of benzene. Stirring was continued for 2.5 hours whereafter 100 milliliters of benzene was added and the resulting solution washed with water, a five percent aqueous solution of solium bicarbonate and finally with water until the washes were neutral. The benzene solution was separated and distilled to yield 2.28 grams of crude progesterone which, when crystallized from fifteen milliliters of ether, yielded 1.62 grams of progesterone melting at 119 to 125 degrees centigrade and melting at 126 to 128 degrees centigrade after crystallization from ethyl acetate.

Example 2.—22-(N-piperidyl)-4,20(22)-bisnorcholadien-3-one-mercuric chloride complex In exactly the same manner as described in Example 1, 22-(N-piperidyl)-4,20(22)-bisnorcholadien-3 - one - mercuric chloride complex was prepared by substituting a molar equivalent of mercuric chloride for the zinc chloride used therein.

Analysis.—Calculated for $(C_{27}H_{41}NO)(HgCl_2)_2$: Cl, 15.1. Found: Cl, 16.65; Cl, 15.69.

Oxidation of 1.88 grams of this mercuric chloride complex with sodium dichromate as described in Example 1 yielded 0.52 gram, a yield of 82 percent of the theoretical, of progesterone melting at 100 to 120 degrees centigrade and which, when chromatographed over Florisil synthetic magnesium silicate, using petroleum ether plus five percent acetone as the eluant, melted at 129 to 130 degrees centigrade.

Similarly, following the procedure described in Example 1, the zinc bromide, aluminum chloride and antimony trichloride complexes of 22-(N-piperidyl)-4,20(22)-bisnorcholadien-3-one were prepared by substituting zinc bromide, aluminum chloride and antimony trichloride, respectively, for the zinc chloride used therein.

*Example 3.—22-(N-piperidyl)-20(22)-bisnorcholen-3-one-zinc chloride complex*

Following the procedure described in Example 1, 0.344 gram (0.86 millimole) of 22-(N-piperidyl)-20(22)-bisnorcholen-3-one was allowed to react with 0.34 gram (2.5 millimoles) of zinc chloride in an ether solution to form 0.599 gram of 22-(N-piperidyl)-20(22)-bisnorcholen-3-one-zinc chloride complex.

*Analysis.*—Calculated for $(C_{27}H_{43}NO)(ZnCl_2)_3$: Cl, 26.3. Found: Cl, 23.45.

In the same manner as described in Example 1, the thus-produced 22-(N-piperidyl)-20(22)-bisnorcholen-3-one zinc chloride complex was oxidized with sodium dichromate to pregnane-3,20-dione.

*Example 4.—22-(N-piperidyl)-4,20(22)-bisnorcholadien-3-one-zinc chloride complex from a mixture of steroids*

Ten grams of mixed soya sterols were oxidized to $\Delta^4$-3-keto steroids by heating them for one hour in 100 milliliters of refluxing toluene containing forty milliliters of cyclohexanone and six grams of aluminum isopropoxide. The cooled reaction mixture was neutralized by the addition of sixty milliliters of ten percent hydrochloric acid and the organic layer was then subjected to steam distillation until four liters of distillate were collected. The residue from the distillation contained 10.52 grams of a crude mixture of stigmastadienone and sitostenones which were filtered and dried.

The crude mixture was dissolved in 660 milliliters of methylene chloride containing 5.2 milliliters of pyridine and was ozonized by bubbling oxygen, containing 5.62 milligrams of ozone per 200 milliliters at standard temperature and pressure, into the solution at the rate of 200 milliliters per minute and at a temperature of minus seventy degrees centigrade for 48 minutes until a total of 268 milligrams of ozone had passed into the solution. The cold solution was mixed with five grams of zinc dust followed by 110 milliliters of acetic acid. The resulting mixture was warmed to room temperature and stirred for an additional 1.5 hours. The zinc dust was removed by filtration and the acetic acid was washed from the filtrate with three 200-milliliter portions of water followed by two 100-milliliter portions of an aqueous ten percent solution of sodium hydroxide and then with water until the washes were neutral. The organic layer was dried and the solvent distilled therefrom. The 11.1-gram residue was essentially a mixture of sitosteryl $\Delta^4$-3-ketones and 3-keto-4-bisnorcholen-22-al, the latter's presence being confirmed by papergram analysis.

A 5.5-gram portion of the thus-produced mixture was dissolved in a mixture of 34 milliliters of benzene and 66 milliliters of petroleum ether and chromatographed over a 400-gram column of Florisil synthetic magnesium silicate. The sitostenones were eluted with petroleum ether plus two percent acetone, and 0.45 gram of 3-keto-4-bisnorcholen-22-al, was eluted with petroleum ether plus eight percent acetone.

The remaining 5.5-gram portion of the steroidal product of the ozonalysis, containing an estimated 0.45 gram (1.37 millimoles) of 3-keto-4-bisnorcholen-22-al, was dissolved in about 35 milliliters of benzene and then about a quarter of a milliliter of piperidine and five milligrams of para-toluensulfonic acid were added. The mixture was refluxed with a Dean-Stark water trap for four to six hours. The thus-produced steroidal mixture consisted essentially of sitostenones and 22-(N-piperidyl)-4,20(22)-bisnorcholadien-3-one.

This crude reaction mixture was mixed with about one gram of zinc chloride in twenty milliliters of anhydrous ether whereupon essentially pure 22-(N-piperidyl)-4,20(22)-bisnorcholadien-3-one-zinc chloride complex precipitated from the reaction mixture and was filtered therefrom.

Oxidation of the thus-precipitated 22-(N-piperidyl)-4,20(22)-bisnorcholadien-3-one zinc chloride complex with sodium dichromate in a mixture of benzene and acetic acid, according to the procedure described in Example 1, produced progesterone melting at 127 to 129 degrees centigrade.

Similarly, other 22-(N-piperidyl)-4,20(22)-bisnorcholadien-3-one-metal halide complexes can be prepared by mixing a solution of the selected B-group metal halide, preferably a group IIB-metal halide, in an organic diluent, with the crude reaction mixture formed by the reaction of piperidine with the mixture of sitostenones and 3-keto-4-bisnorcholen-22-al.

Other steroid enamine-metal halide complexes which may be prepared include the zinc chloride complexes of 3-(N-pyrrolidyl)-2,4-pregnadien-20-one, of 3-(N-pyrrolidyl)-4-pregnen-20-one, of 3-(N-pyrrolidyl)-2,4-androstadien-17-one, of 3-(N-pyrrolidyl)-2,4-androstadien-17$\beta$-ol, of 22-(N-pyrrolidyl)-5,20(22)-bisnorcholadien-3$\beta$-ol, and other complexes of these and other steroid enamines such as, for example, the cadmium chloride, stannic chloride, and bismuth bromide complexes. These complexes may be oxidized to produce steroidal carbonyl compounds or used to regenerate the thus-purified enamine or the original carbonyl compound from which the enamine was produced, by washing with water and/or base ore acid.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A metal halide complex compound selected from the group consisting of 22-N-piperidyl-20(22)-bisnorcholen-3-one metal halide complex and 22-N-piperidyl-4,20(22)-bisnorcholadien-3-one metal halide complex wherein the metal is selected from the group consisting of zinc, mercury, aluminum, and antimony, and wherein the halide ion is selected from the group consisting of chloride and bromide.

2. 22-(N-piperidyl)-20(22)-bisnorcholen-3-one-zinc chloride complex.

3. 22-(N-piperidyl)-4,20(22)-bisnorcholadien-3-one-zinc chloride complex.

4. A process for the separation of steroids which comprises: combining a solution of 22-N-piperidyl-4,20(22)-bisnorcholadien-3-one and sitosteryl $\Delta^4$-3-ketones in a substantially anhydrous organic solvent with greater than three molar equivalents, calculated on the enamine, of zinc chloride and separating the precipitated 22-N-piperidyl-4,20(22)-bisnorcholadien-3-one-zinc chloride complex.

5. A process for the separation of steroids which comprises the steps of first, condensing 3-keto-4-bisnorcholen-22-al, mixed with sitosteryl $\Delta^4$-3-ketones in an essentially anhydrous solvent, with piperidine to produce 22-N-piperidyl-4,20(22)-bisnorcholadien-3-one, and second, adding a chloride of a metal of the group consisting of zinc, mercury, aluminum, and antimony to the resulting mixture and separating the precipitated 22-N-piperidyl-4,20(22)-bisnorcholadien-3-one-metal chloride complex.

6. The process of claim 5 wherein the halide salt is zinc chloride.

7. A process for the separation of steroids which comprises the steps of first, ozonizing 4,22-stigmastadien-3- one, mixed with 4-sitosten-3-ones in substantially anhydrous solvent, to produce 3-keto-4-bisnorcholene-22-al; second, condensing the thus-produced 3-keto-4-bisnorcholen-22-al, mixed with the sitosteryl $\Delta^4$-3-ketones in solution in an essentially anhydrous solvent, with piperidine to produce 22-N-piperidyl-4,20(22)-bisnorcholadien-3-one; and third, adding a chloride of a metal of the group consisting of zinc, mercury, aluminum, and antimony to the resulting mixture and separating the precipitated 22-N-piperidyl-4,20(22) - bisnorcholadien - 3 - one-metal chloride complex.

8. The process of claim 7 wherein the halide salt is zinc chloride.

9. A process for the separation of steroids which comprises the steps of first, oxidizing stigmasterol, mixed with sitosterols in an organic solvent, to produce 4,22-stigmastadiene-3-one; second, ozonizing the thus-produced 4,22-stigmastadien-3-one, mixed with the thus-produced 4-sitosten-3-ones in an essentially anhydrous solvent, to produce 3-keto-4-bisnorcholen-22-al; third, condensing the thus-produced 3-keto-4-bisnorcholen-22-al, mixed with the sitosteryl $\Delta^4$-3-ketones in solution in an essentially anhydrous solvent, with piperidine to produce 22-N-piperidyl-4,20(22)-bisnorcholadien-3-one; and fourth, adding a chloride of a metal of the group consisting of zinc, mercury, aluminum, and antimony to the resulting mixture and separating the precipitated 22-N-piperidyl-4,20(22)-bisnorcholadien-3-one-metal chloride complex.

10. The process of claim 9 wherein the halide salt is zinc chloride.

11. A process for the separation of an enamine steroid from a nonsterol, essentially neutral steroid which comprises: combining a mixture comprising (a) an enamine steroid compound selected from the group consisting of a 22-(N - substituted) 4,20(22) - bisnorcholadien - 3 - one wherein the "-(N-substituted)" radical is selected from the pyrrolidyl, piperidyl, morpholinyl, di-lower-alkylamino, and dibenzylamino radicals, and (b) a non-sterol, essentially neutral steroid, in an organic solvent, with a metal halide wherein the metal is selected from the group consisting of zinc, mercury, aluminum and antimony, and wherein the halide ion is selected from the group consisting of chlorine and bromine, to form a precipitate of an enamine steroid metal halide complex, and separating said precipitate.

12. A process for the separation of steroids which comprises: combining a mixture of (a) a 22-N-piperidyl compound of the bisnorcholene series and (b) a nonsterol, essentially neutral steroid, with a chloride of a metal of the group consisting of zinc, mercury, aluminum, and antimony, in an organic solvent, and separating as a precipitate the thus formed 22-N-piperidyl compound metal chloride complex.

References Cited in the file of this patent

UNITED STATES PATENTS

| | | |
|---|---|---|
| 2,536,753 | Knol | Jan. 2, 1951 |
| 2,568,202 | Overhoff | Sept. 18, 1951 |

OTHER REFERENCES

Herr: J. Am. Chem. Soc., pp. 3627–30, vol. 74 (1952).